Figures 12, 13, 14, 15:
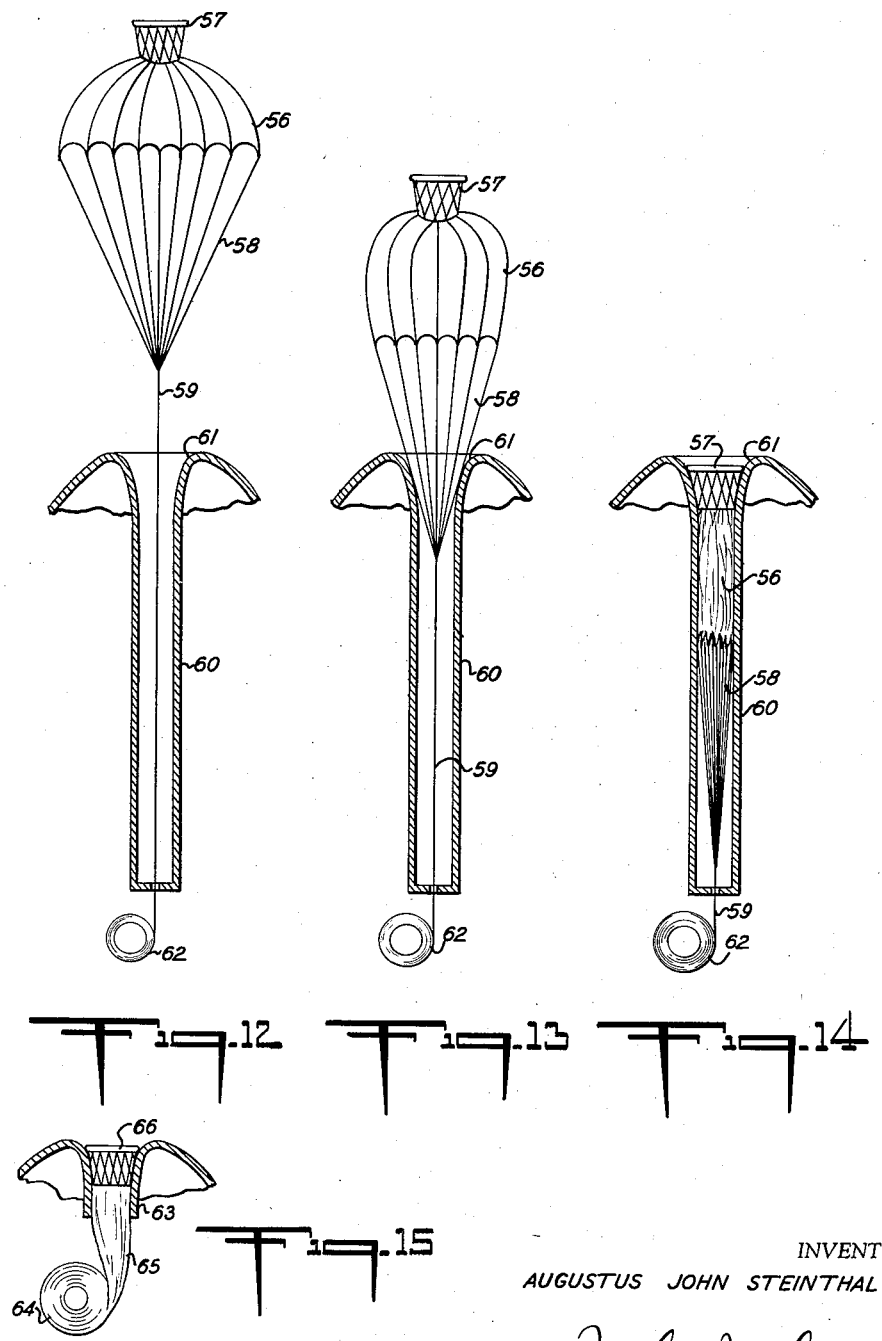

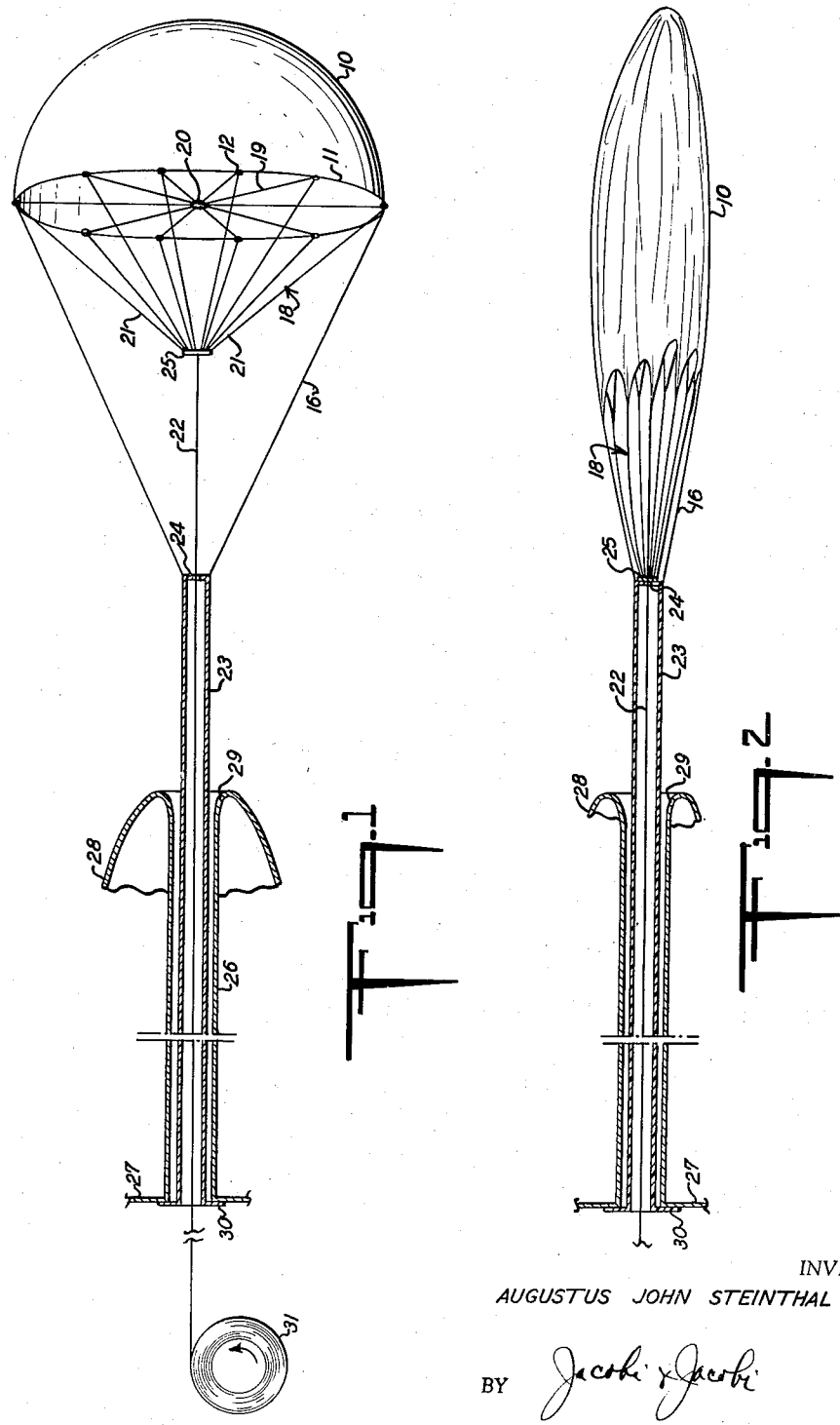

Feb. 21, 1961  A. J. STEINTHAL  2,972,457
RETRACTABLE PARACHUTE SYSTEM FOR AIRCRAFT
AND PILOT CHUTE EJECTING MECHANISM
Filed April 26, 1957  7 Sheets-Sheet 2
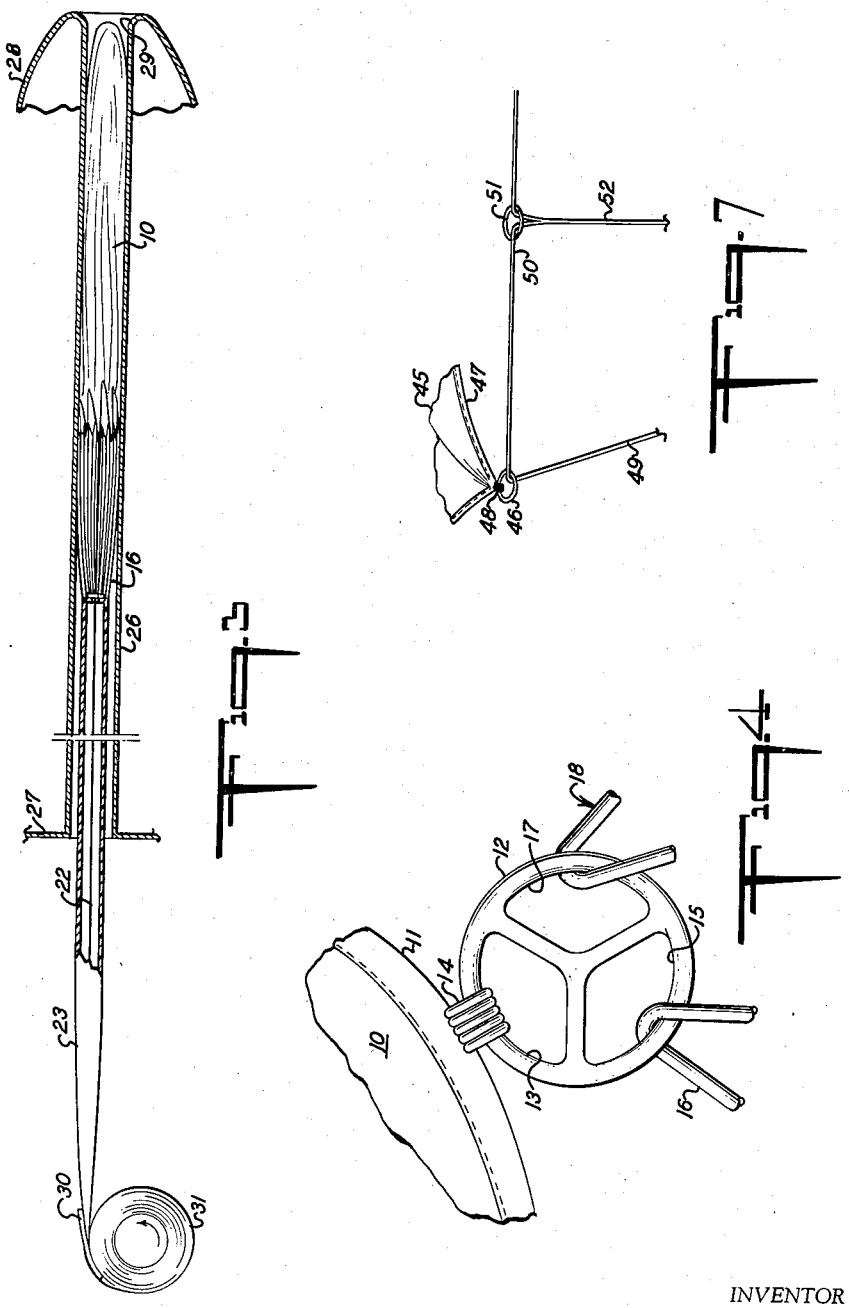
INVENTOR
AUGUSTUS JOHN STEINTHAL
BY  *Jacobi & Jacobi*
ATTORNEYS

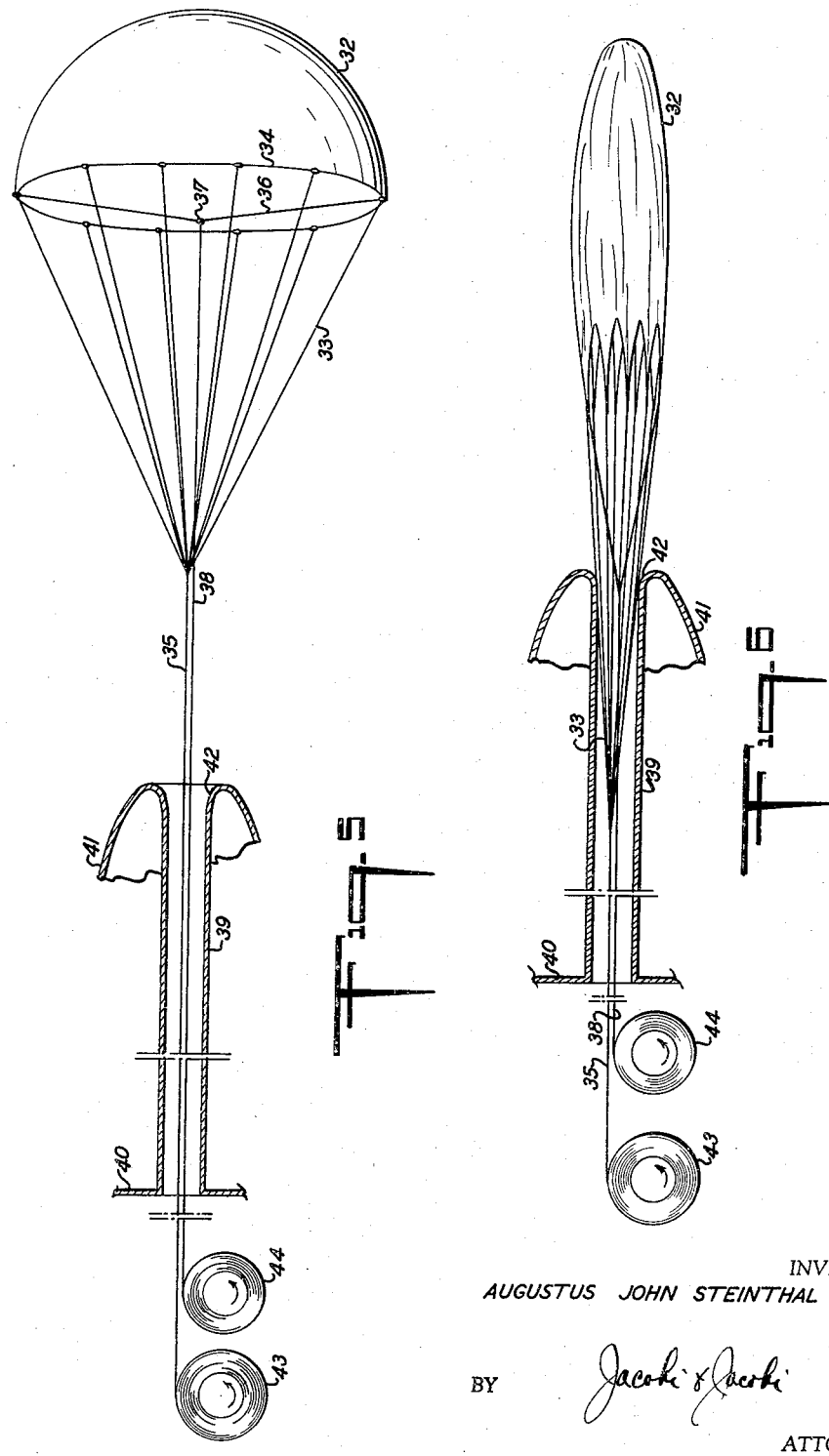

Feb. 21, 1961 A. J. STEINTHAL 2,972,457
RETRACTABLE PARACHUTE SYSTEM FOR AIRCRAFT
AND PILOT CHUTE EJECTING MECHANISM
Filed April 26, 1957 7 Sheets-Sheet 4
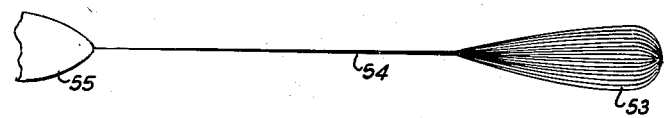
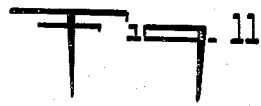
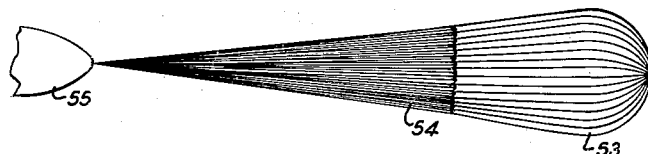
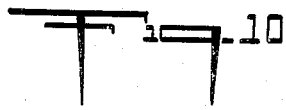
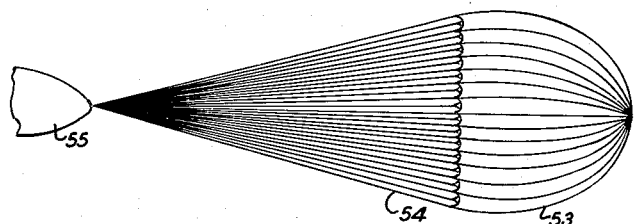
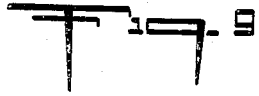
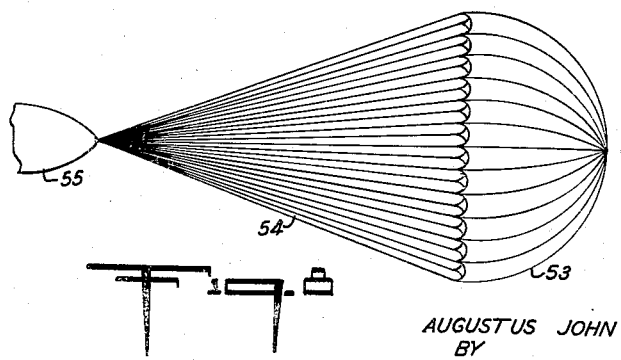
INVENTOR
AUGUSTUS JOHN STEINTHAL
BY
ATTORNEYS

INVENTOR
AUGUSTUS JOHN STEINTHAL

INVENTOR
AUGUSTUS JOHN STEINTHAL

BY *Jacobi & Jacobi*

ATTORNEYS

United States Patent Office 2,972,457
Patented Feb. 21, 1961

2,972,457
RETRACTABLE PARACHUTE SYSTEM FOR AIRCRAFT AND PILOT CHUTE EJECTING MECHANISM

Augustus John Steinthal, New York, N.Y., assignor to M. Steinthal & Co., Inc., New York, N.Y., a corporation of New York Filed Apr. 26, 1957, Ser. No. 655,203

7 Claims. (Cl. 244—113)

This invention relates to aeronautics and more particularly to a retractable parachute system for aircraft and pilot chute ejecting mechanism. The parachute system of this invention is intended to be utilized as a drag chute for decelerating the speed of aircraft during landing.

As is well known, modern aircraft, particularly those of the jet propelled type, have a relatively high landing speed and while with piston engine aircraft, the pitch of the propellers may be reversed to slow the aircraft during landing, such an expedient is not available with jet propelled aircraft. As a consequence, it has been necessary to provide extremely long runways for landing strips thereby materially increasing the cost of airport construction and furthermore, the provision of extra long runways is in many instances, not feasible due to the terrain and this, of course, is often true in military installations, particularly in areas utilized for military operations and in which it is often necessary to construct a landing strip in a relatively short time.

There is also the further consideration that in landing relatively high speed aircraft of the jet propelled type, the stopping of the aircraft within a reasonable distance results in excessive wear of the brakes and tires thereby materially increasing the cost of maintenance and one of the more important considerations is that of safety, since in the event an aircraft over-shoots the runway, damage to such aircraft inevitably results and in some instance, the flight personnel may be injured.

Accordingly, a system which will provide for relatively rapid deceleration of a landing aircraft within a reasonable distance and one which will result in reducing the wear on brakes and tires of such aircraft represents a very material step forward in the art and such a system is provided by this invention. While the drag chute system of this invention is primarily intended for use in jet propelled aircraft in normal landing operations, nevertheless, the same may be conveniently installed in piston engine planes to be utilized for deceleration purposes during emergency landings and which will permit such landings on relatively short runways or landing strips such as are frequently found at emergency landing fields.

Drag chute systems for aircraft have in the past generally included a main drag chute having a canopy and shroud lines terminating in a riser which is attached to the aircraft. A pilot chute of considerably smaller diameter than the main chute is provided and the shroud lines of such pilot chute are connected to a bridle and a similar bridle is attached at substantially the center of the canopy of the main chute. A deployment bag is provided having two compartments therein, one for receiving the main chute when in folded condition and the other for receiving the pilot chute when in folded condition. This results in providing a unitary package which may be conveniently stowed in the drag chute compartment of the aircraft and, of course, means is provided for releasing the pilot chute from the deployment bag, which pilot chute when inflated serves to pull the deployment bag and main chute from the drag chute compartment of the aircraft, as a result of which a rip cord means on the deployment bag is operated to open the compartment containing the main drag chute whereupon such chute is inflated and serves to decelerate the speed of the aircraft to which the same is attached. After landing, the main drag chute together with the deployment bag and pilot chute is disconnected from the aircraft and such chutes are repacked in the deployment bag for stowage in the aircraft and is then available for further landing operations.

As mentioned above under present practices, after completing a landing run, the drag chute system is detached from the aircraft and consequently, it is necessary to provide personnel and vehicles for picking up the detached drag chute systems and furthermore, such chutes must be repacked prior to stowage in the aircraft for further landing operations. The packing of parachutes requires very highly trained personnel and consequently, the maintenance, care and use of present drag chute systems materially contributes to the cost of aircraft operations. Accordingly, some system whereby the drag chute might be automatically retracted within the aircraft after completion of a landing run, would eliminate both the need for retrieving the detached drag chute system and for repacking the same and furthermore, would make the aircraft available for an immediate takeoff and landing which is not possible with the present system. While it would be advantageous to provide means operable by the pilot of the aircraft to pre-select the decelerating force exerted by the drag chute, this has not heretofore been possible, since the drag chutes now utilized inflate to maximum diameter and consequently, apply the maximum decelerating force of which that particular parachute is capable. However, in certain instances, it may be desirable to vary the decelerating force progressively as the aircraft slows down or it may be desired to preset the decelerating force at a selected value prior to making the landing and which such preset force maintained throughout the landing run. With the drag systems now in use, no means has been provided for reefing to reduce the diameter thereof and consequently, the decelerating force could not be varied and furthermore, no means has been provided to retract the drag chute system within the aircraft without first detaching such system and repacking the same in a deployment bag which is thereafter stowed in the aircraft.

It is accordingly an object of the invention to provide a retractable parachute system for aircraft which system will provide a suitable decelerating force and which may be retracted within the aircraft for subsequent use.

A further object of the invention is the provision of a retractable parachute system for aircraft including means for permitting reefing of the parachute canopy to reduce the diameter thereof and collapse the same preparatory to retraction of the parachute system within the aircraft.

A still further object of the invention is the provision of a retractable parachute system for aircraft incorporating a tubular riser attached to the shroud lines of the canopy and in which a control line for reefing the parachute passes through the tubular riser and is attached to a single winding drum within the aircraft, operation of which performs the reefing operation and retracts the parachute and riser within the aircraft.

Another object of the invention is the provision of a retractable parachute system for aircraft including a riser connected to the shroud lines of the canopy and to a winding drum mounted within the aircraft and a control line attached to the canopy in a manner to reef and collapse the same and also secured to a second winding drum within the aircraft whereby operation of the winding drums will serve to first reef and collapse the parachute and thereafter retract the same within the aircraft.

A further object of the invention is the provision in a retractable parachute system for aircraft of a novel means for attaching shroud lines to the edge of the parachute canopy and for also receiving reefing lines and permitting free movement of such lines during reefing operations and serving to prevent fouling of the reefing lines and shroud lines.

A still further object of the invention is the provision of a retractable parachute system for aircraft in which the shroud lines and reefing lines are connected together by means of a control line and serve to operate simultaneously in the reefing and collapsing of the parachute canopy and also in retracting the same within the aircraft.

Another object of the invention is the provision of a method of varying the drag of a decelerating parachute system for aircraft, which method permits pre-selection of the decelerating exerted by the drag chute.

A further object of the invention is the provision of a method of varying the drag of a decelerating parachute for aircraft in which such decelerating drag may be progressively decreased during a landing run and under control of the pilot.

A still further object of the invention is the provision of a retractable parachute system for aircraft including a parachute canopy having shroud lines connected to a riser which in turn is secured to a winding drum within the aircraft and in which a tubular parachute receiving housing fixed in the aircraft and having a flared outer end serves to engage the shroud lines during retracting of the parachute to reduce the diameter of the canopy and collapse the same thereby permitting retraction of the parachute within the tubular housing.

Another object of the invention is the provision of a retractable parachute system for aircraft in which a parachute canopy is provided with shroud lines connected to a riser which in turn is secured to a winding drum within the aircraft and a funnel fixed to the rear end of the aircraft whereby upon operation of the winding drum, the shroud lines of the parachute engage the funnel to reduce the diameter of the canopy and collapse the same and further operation of the winding drum serves to wind the riser, shroud lines and a portion of the parachute on the winding drum and retract the same within the aircraft.

A further object of the invention is the provision of a pilot chute ejecting mechanism for aircraft incorporating a slidable tubular housing for receiving the parachute, together with compression spring means for moving the housing outwardly with a snap action to eject the pilot chute from the aircraft.

A still further object of the invention is the provision of a pilot chute ejecting mechanism for aircraft, including a tubular pilot chute receiving housing fixed in the aircraft and a plunger means operable by an explosive charge to eject the pilot chute from the housing and the aircraft.

Figure 16:
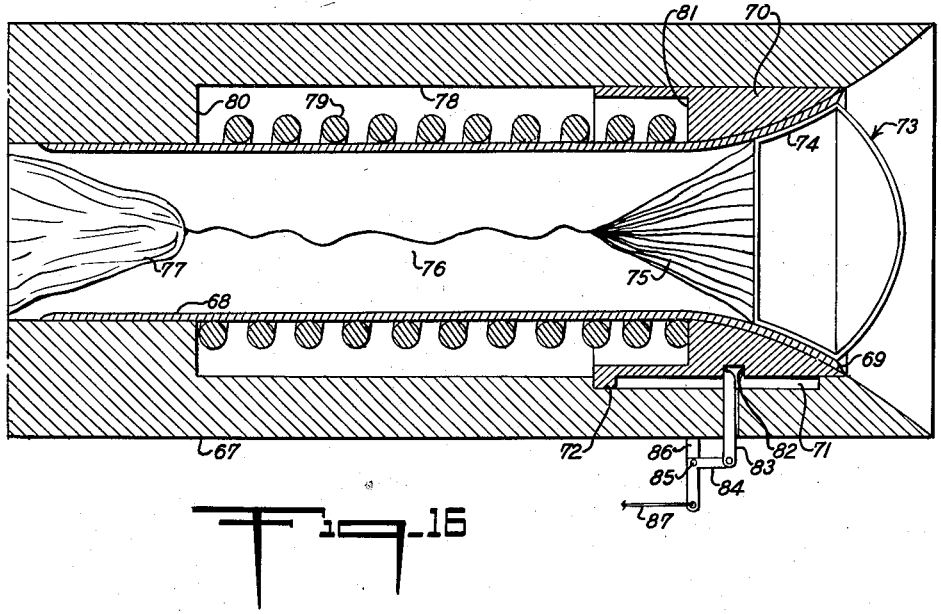
Figure 17:
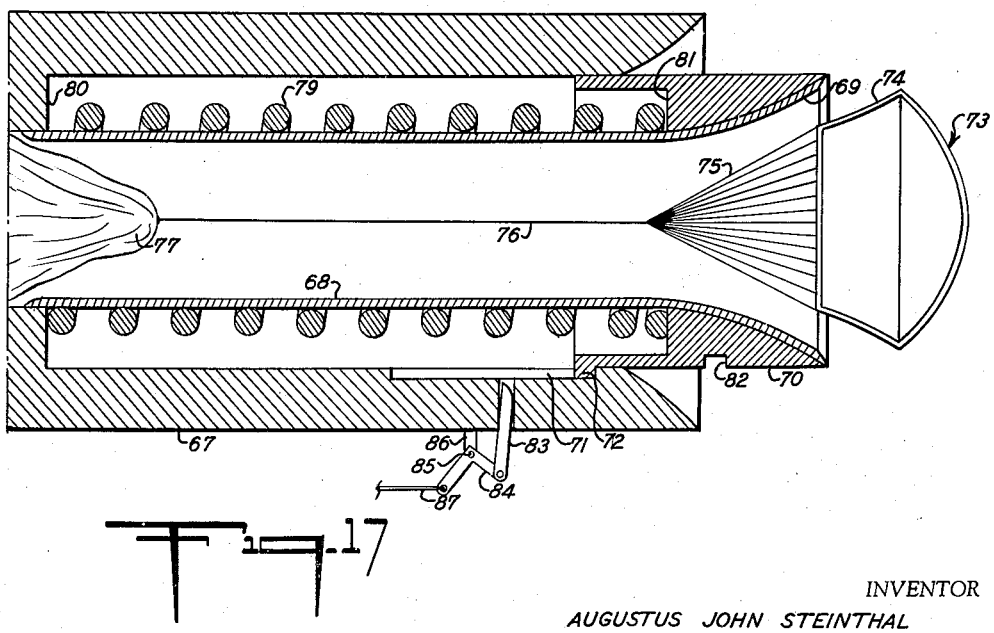
Figure 18:
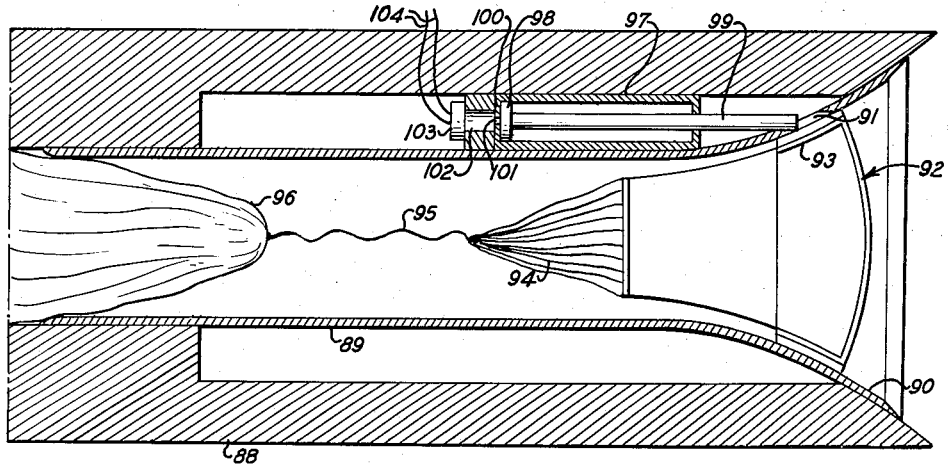
Figure 19:
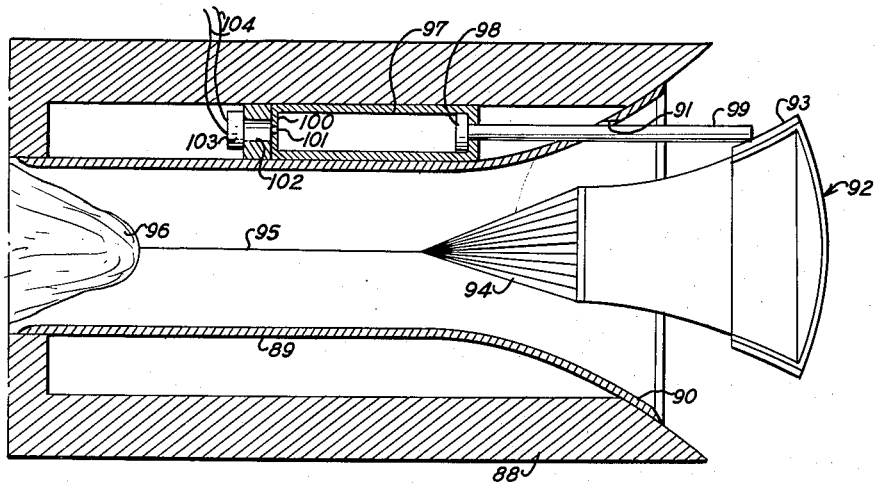

Further objects and advantages of the invention will be apparent from the following description taken in conjunction with the accompanying drawings wherein:

Fig. 1 is a fragmentary side elevational view with parts in section for greater clarity and showing the parachute inflated for a landing run;

Fig. 2 a view similar to Fig. 1, but showing the parachute canopy collapsed preparatory to retracting the same within the aircraft;

Fig. 3 a view similar to Fig. 2, but showing the parachute, shroud lines and riser retracted within the aircraft;

Fig. 4 a fragmentary view in perspective showing a novel attaching means for securing the shroud lines to the edge of the parachute canopy and for receiving a reefing line to permit free movement thereof and prevent fouling of the same with the shroud lines;

Fig. 5, a side elevational view with parts in section for greater clarity and showing a modified form of the invention with the parachute in inflated condition and also showing a different form of reefing system which utilizes two winding drums, one for the riser and the other for the reefing control line;

Fig. 6 a view similar to Fig. 5 and showing the parachute partially retracted within the aircraft;

Fig. 7 a fragmentary view in perspective showing a still further modified form of reefing system for the parachute system of this invention;

Fig. 8 a side elevational view showing a drag chute fully inflated for exerting maximum decelerating force on the aircraft to which the same is attached;

Fig. 9 a view similar to Fig. 8, but showing the canopy of the parachute partially reefed to reduce the diameter thereof and thereby reduce the decelerating force exerted on the aircraft;

Fig. 10 a view similar to Fig. 9, but showing the parachute canopy still further reefed to further reduce the diameter thereof and provide a further reduced decelerating force on the aircraft;

Fig. 11 a side elevational view showing the parachute canopy fully collapsed to exert a minimum decelerating force and at the same time, prepare the parachute for retraction within the aircraft;

Fig. 12 an elevational view with parts in section for greater clarity and showing a further modified form of retractable parachute system for aircraft constructed in accordance with this invention and incorporating a novel means for reefing the parachute to reduce the diameter of the canopy;

Fig. 13 a view similar to Fig. 12 and showing the canopy partially reefed to reduce the diameter thereof preparatory to retraction of the same within the aircraft;

Fig. 14 a view similar to Fig. 13, but showing the shroud lines, main parachute canopy and pilot chute retracted within the aircraft;

Fig. 15 a fragmentary view in side elevation with parts in section for greater clarity and showing a slightly modified form of the invention shown in Fig. 12;

Fig. 16 a longitudinal sectional view showing a pilot chute ejecting mechanism with the pilot chute in place within the mechanism;

Fig. 17 a view similar to Fig. 16, but showing the operation of the mechanism to eject the pilot chute therefrom;

Fig. 18 a longitudinal sectional view of another form of pilot chute ejecting mechanism utilizing an explosive charge for providing the ejecting force and showing the pilot chute in place preparatory to ejection thereof from the aircraft; and Fig. 19 a view similar to Fig. 18, but showing the operation of the mechanism to eject the pilot chute from the aircraft.

With continued reference to the drawing and particularly Figs. 1, 2, 3 and 4, there is shown a retractable parachute system for aircraft constructed in accordance with this invention and which may well include a parachute canopy 10 of nylon or any other suitable fabric and constructed substantially in a conventional manner. Secured to the edge 11 of the canopy 10 at spaced points are a plurality of shroud line attaching means which as shown in Fig. 4, may well comprise disks 12 formed of metal, plastic or any other suitable material, each disk 12 being provided with an aperture 13 to facilitate attachment of the disk 12 to the edge 11 of the canopy 10 by lacing or threads 14 or in any other suitable manner. The disk 12 is provided with a second aperture 15 for facilitating attachment of a shroud line 16 thereto and also provided in the disk 12 is a third aperture 17 for receiving a reefing line 18 in a manner to be presently described.

As best shown in Fig. 1, a plurality of reefing lines 18 are provided and each of these lines is threaded through an aperture 17 in one of the disks 12 and a portion 19 of each reefing line 18 extends radially inwardly of the canopy 10 and secured at the inner end to a common ring 20 located substantially centrally of the canopy 10. The opposite ends 21 of the reefing lines 18 are brought together and connected to the outer end of a control line 22. The shroud lines 16 are connected to the outer end of a tubular riser 23 and the control line 22 extends through the riser 23.

An abutment 24 is provided on the outer end of the riser 23 and a stop 25 is provided on the control line 22 outwardly of the abutment 24 and the purpose and operation of such abutment 24 and stop 25 will be presently described.

A parachute receiving tubular housing 26 is fixed in the aircraft and may be secured thereto by an inner flange 27 and an outer tapering flange 28. It is to be noted, that the housing 26 is provided with a flared outer end 29 to facilitate entrance of the parachute into the housing 26. An abutment ring 30 is secured to the inner end of the riser 23 and as shown in Fig. 1, with the canopy 10 inflated, the abutment ring 30 engages the flange 27 on the tubular housing 26 and serves to transmit the decelerating load of the parachute to the aircraft. A winding drum 31 is mounted in the aircraft and the inner end of the control line 22 is connected to such winding drum.

In the operation of the form of the invention above described, and assuming that the parachute is in inflated condition as shown in Fig. 1, and that it is desired to retract the same within the tubular housing 26, it is only necessary to operate the winding drum 31 which results in retracting the control line 22 to pull the reefing lines 18 thereby reducing the diameter of the canopy 10 and retracting the same to the condition shown in Fig. 2. During this reefing operation, the stop 25 on the control line 22 will move into engagement with the abutment 24 on the outer end of the riser 23 and further or continued operation of the winding drum 31 will result in moving the riser 23 and control line 22 inwardly of the tubular housing 26 and as best shown in Fig. 3, the abutment ring 30 will move away from the flange 27 on the housing 26 and such ring 30, as well as the riser 23 will be received on the winding drum 31, continued operation of which will retract the riser 23, shroud lines 16 and canopy 10 within the tubular housing 26, as clearly shown in Fig. 3. In view of the fact, that the canopy 10 is reefed to reduce the diameter thereof and collapse the same prior to retraction within the aircraft, it will be seen, that the load on the winding drum 31 is substantially reduced and that retraction of the canopy 10 may be accomplished without difficulty.

With particular reference to Figs. 5 and 6, there is shown a modified form of retractable parachute system for aircraft constructed in accordance with this invention and which may well comprise a parachute canopy 32 having shroud lines 33 secured at spaced points to the edge 34 of the canopy 32. The opposite ends of the shroud lines 33 are secured to the outer end of a riser 35. A reefing line 36 extends across the canopy 32 and is attached to the edge 34 thereof at diametrically opposite points. Connected to the midpoint 37 of the reefing line 36 is a control line 38.

Fixed in the aircraft is a tubular parachute receiving housing 39, which housing may be attached to the aircraft by an inner flange 40 and by an outer tapered flange 41. It is to be noted, that the housing 39 is provided with a flared outer end 42 for facilitating passage of the parachute into the housing 39. Riser 35 and control line 38 extend through the tubular housing 39 and the riser 35 is secured to a winding drum 43 mounted within the aircraft while the control line 38 is secured to a second winding drum 44 also mounted within the aircraft.

In the operation of the form of the invention shown in Figs. 5 and 6, and assuming that the canopy 32 is inflated as shown in Fig. 5, operation of the winding drum 44 will serve to move the control line 38 inwardly and pull the reefing line 36 thereby pulling opposite side edges of the canopy 32 inwardly to collapse the canopy as shown in Fig. 6 and thereafter operation of the winding drum 43 and continued operation of the winding drum 44 will result in retracting the riser 35, control line 38, shroud line 33 and the canopy 32 entirely within the tubular parachute receiving housing 39.

A still further modified form of the invention is shown in Fig. 7 in which a parachute canopy 45 is provided with a plurality of rings 46 attached to the edge 47 of the canopy 45 at spaced points in any suitable manner, as by stitching 48. Shroud lines 49 are threaded through the rings 46 and the inner ends 50 of the shroud lines 49 extend radially inwardly of the canopy 45 and are threaded through a central ring 51 and attached to the outer end of a control line 52. The opposite ends of the shroud lines 49 will, of course, be attached to the outer end of a riser, not shown.

The parachute system shown in Fig. 7 may be utilized with either the single winding drum system shown in Fig. 1, or the double winding drum system shown in Fig. 5 and in operation, it is only necessary to operate the appropriate winding drum to retract the control line 52 which will result in pulling the shroud lines 49 through the rings 46 thereby reducing the diameter of the canopy 45 to collapse the same and further operation of the single winding drum or operation of the two winding drums as the case may be, will thereafter result in retracting the parachute within the tubular housing provided in the aircraft.

Figs. 8, 9, 10 and 11 illustrate a method of reefing the parachute in order to provide a selected decelerating load on an aircraft and for this purpose, either the reefing system shown in Fig. 1 or the reefing system shown in Fig. 7 may be utilized. As shown in Fig. 8, the canopy 53 of the parachute is fully inflated and in this condition will provide maximum decelerating drag which is transmitted through the shroud lines 54 to the aircraft 55 in the manner described above in connection with the other forms of the invention.

Operation of the reefing mechanism will result in reducing the diameter of the canopy 53 as shown in Fig. 9, which will result in providing a reduced decelerating load on the aircraft and if a further reduction in the decelerating load is desired, the canopy 53 may be reefed to reduce the diameter further, as shown in Fig. 10 and the decelerating force may be reduced to a minimum by substantially completely collapsing the canopy 53 as shown in Fig. 11.

The reefing of the canopy 53 to provide the desired decelerating load may be accomplished prior to ejection of the parachute from the aircraft or may be accomplished progressively after ejection of the parachute and during the landing run of the aircraft. For this purpose there may be provided a control panel, not shown, having controls thereon for operating the appropriate winding drum to establish the length of the control line for the particular reefing system utilized to provide the desired diameter of the parachute canopy thereby providing the desired decelerating load. The appropriate winding drum can also, of course, be operated to provide a continuously variable decelerating load by slowly retracting the control line during the landing run thereby progressively reducing the diameter of the canopy and at the same time, progressively reducing the decelerating load exerted by the parachute on the aircraft.

A still further modified form of the invention is shown in Figs. 12, 13 and 14 in which a parachute canopy 56 is provided with a pilot chute 57 secured thereto in any desired manner and the canopy 56 is connected by shroud lines 58 to the outer end of a riser 59. A tubular parachute receiving housing 60 is fixed in the aircraft in any suitable manner and the housing 60 is provided with a flared outer end 61, the purpose of which will presently appear. The riser 59 extends through the tubular housing 60 and is attached to a winding drum 62 mounted within the aircraft.

As shown in Fig. 12, the canopy 56 is fully inflated and in a condition to exert a maximum decelerating force on the aircraft and when it is desired to retract the canopy 56 within the housing 60, the winding drum 62 is operated to pull the parachute 56 toward the aircraft and upon the shroud lines 58 entering the flared outer end 61 of the housing 60, such shroud lines will contact the surface of the flared outer end 61 to move the shroud lines toward each other thereby reducing the diameter of the canopy 56 as shown in Fig. 13 and continued operation of the winding drum 62 will result in completely collapsing the canopy 56 thereby permitting retraction of the same within the housing 60 as shown in Fig. 14 and in which position the pilot chute 57 closes the outer end of the housing 60. This form of the invention eliminates the necessity for providing a separate reefing system for the canopy of the parachute, but it is to be noted, that the winding drum 62 must initially operate against the full load of the parachute and such load is not reduced until the shroud lines 58 contact the flared outer end 61 of the housing 60 to progressively reduce the diameter of the canopy 56 thereby reducing the load on the winding drum 62.

The form of the invention shown in Fig. 15 operates in substantially the same manner as that described above in connection with Figs. 12, 13 and 14, but in this form of the invention, the tubular housing 60 is replaced by a funnel 63 fixed in the aircraft at the rear end thereof and upon operation of the winding drum 64 mounted in the aircraft, the riser and shroud lines, not shown, are retracted into the funnel 63 which engages the shroud lines to reduce the diameter of the canopy 65 and collapse the same and continued operation of the winding drum 64 results in winding the riser, the shroud lines and a portion of the canopy 65 on the winding drum until such time as the pilot chute 66 seats in the funnel 63 to close the same. This form of the invention may be utilized in aircraft where space is at a minimum and where it is inconvenient to install a relatively long parachute receiving tubular housing as shown in the other forms of the invention.

In Figs. 16 and 17, there is shown a pilot chute housing and ejecting mechanism which may be conveniently installed in aircraft and which may well include an elongated tubular body member 67 secured to the aircraft in any desired manner and opening at the rear end of such aircraft. Slidably mounted in the tubular body member 67 is a tubular housing 68 and such housing 68 is provided with a flared outer end 69 surrounding which and fixed thereto is a guide collar 70 which is slidably mounted in the tubular body member 67. The tubular body member 67 may be provided with a groove 71 for receiving a lug 72 on the collar 70 which serves to limit sliding movement of the tubular housing 68 within the body 67.

A pilot chute 73 is provided with a substantially rigid tapered ring 74 which seats in the flared outer end 69 of the tubular housing 68 and the pilot chute 73 may be connected through shroud lines 75 and a bridle 76 with the canopy 77 of the main parachute.

An elongated annular recess 78 is provided in the tubular body member 67 and disposed in the recess 78 is a compression spring 79 surrounding the tubular housing 68, one end of the compression spring 79 engaging the end wall 80 of the annular recess 78 and the opposite end of the compression spring 79 engaging a shoulder 81 on the collar 70 fixed to the tubular housing 68.

As shown in Fig. 16, the pilot chute 63 is seated within the flared outer end 69 of the tubular housing 68 and the housing and collar 70 are moved inwardly of the tubular body member 67 to compress the spring 79. In order to hold the collar 70 and housing 68 in the position shown in Fig. 16 to maintain the spring 79 in compressed condition, there may be provided a notch 82 in the collar 70 which serves to receive the inner end of a latch bar 83. The outer end of the latch bar 83 is pivotally attached to a bell crank lever 84 which in turn is pivotally mounted at 85 on a bracket 86 secured to the body member 67. A cable 87 or other suitable means may be attached to the bell crank lever 84 in order that the latch bar 83 may be actuated to withdraw the same from the notch 82 in the collar 70. Upon actuation of the latch bar 83 to withdraw the same from the notch 82, the collar 70 and tubular housing 68 will move outwardly with a snap action to the position shown in Fig. 17 and with the lug 72 on the collar 70 engaging the end wall of the groove 71 whereupon the pilot chute 73 will be ejected from the tubular housing 68 and upon inflation of the pilot chute 73, the main parachute canopy 77 will be withdrawn from the aircraft to inflate and provide a decelerating load during a landing run.

The pilot chute ejecting mechanism above described, may be conveniently installed in conventional aircraft and is of extremely simple construction, yet highly effective in ejecting a pilot chute in order to permit inflation of the same to withdraw the main parachute canopy. If desired, the latch bar 83 may be actuated by a solenoid or by any other suitable means, rather than by the flexible cable 87.

Another form of pilot chute ejecting and housing mechanism is shown in Figs. 18 and 19 in which there is provided an elongated tubular body member 88 installed in the aircraft and opening at the rear end thereof. Fixed within the body member 88 is a tubular parachute receiving housing 89, which housing is provided with a flared outer end 90. An aperture 91 is provided in the flared outer end 90 of the tubular housing 89 and the purpose of such aperture 91 will presently appear.

A pilot chute 92 is provided with a substantially rigid annular ring 93 which seats in the flared outer end 90 of the tubular housing 89 and when in seated position is in alignment with the aperture 91, as clearly shown in Fig. 18. The pilot chute 92 is connected through shroud lines 94 and a bridle 95 with the main parachute canopy 96 disposed in a suitable housing in the aircraft.

A cylinder 97 is disposed substantially parallel to the axis of the tubular housing 89 and the cylinder 97 is fixed with relation to such housing and slidably mounted in the cylinder 97 is a piston 98 to which is attached a plunger 99, which plunger extends through the aperture 91 and engages the substantially rigid annular ring 93 on the pilot chute 92. The cylinder 97 is provided with an end wall 100 having an aperture 101 therein communicating with a chamber 102 which is adapted to receive any suitable explosive charge. The chamber 102 may be closed by a removable breach block 103 to permit insertion of an explosive charge in the chamber 102 and the breach block 103 may be provided with any suitable explosive charge detonating means which may be actuated by an electrical current supplied through wires 104 connected thereto and to a suitable control switch convenient to the pilot of the aircraft. While only a single cylinder 97 and plunger 99 is shown, it is to be understood, that any desired or necessary number of such cylinders and plungers may be disposed around the tubular housing 89 in order to provide a suitable ejecting force for the pilot chute 92.

In operation, with the pilot chute 92 seated in the flared outer end 90 of the housing 89, the explosive charge in the chamber 102 will be detonated and the force thereof will serve to propel the piston 98 and plunger 99 outwardly which will result in the plunger 99 engaging the substantially rigid annular ring 93 in the pilot chute 92 and ejecting such pilot chute from the housing 89 as clearly shown in Fig. 19. This will result in inflation of the pilot chute 92 which in turn will pull the main parachute canopy 96 from the housing and permit inflation thereof to decelerate the aircraft during a landing run. Retraction of the main parachute canopy 96 and the pilot chute 92 within the aircraft and within the housing 89 will result in moving the plunger 99 and piston 98 inwardly to the original position shown in Fig. 18 and preparatory to a future ejecting operation.

The ejecting mechanism shown in Figs. 18 and 19 may be conveniently installed in existing aircraft or in newly designed aircraft and a relatively small explosive chhrge will provide a sufficient force to eject the pilot chute in such a manner as to permit rapid inflation thereof. This ejecting mechanism requires only a single moving part, such as the piston and plunger and consequently, the likelihood of damage or failure is reduced to a minimum thereby contributing to the efficient operation of the mechanism.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A retractable parachute system for aircraft, said system including a parachute canopy, a plurality of disks secured to the edge of said canopy at spaced points, each disk having an aperture therein for facilitating attachment to said canopy, a second aperture in each disk for facilitating attachment of the outer end of a shroud line thereto, an elongated tubular riser, the inner ends of the shroud lines being connected to the outer end of said tubular riser, a third aperture in each disk, reefing lines threaded through said third apertures and extending radially inwardly of said canopy with the inner ends of said reefing lines secured to a common ring centrally of said canopy, the opposite ends of said reefing lines being brought together and connected to the outer end of a control line, said control line extending through said riser, an abutment on the outer end of said riser, a stop on said control line outwardly of said abutment, a parachute receiving tubular housing fixed in the aircraft, said housing having a flared outer end, a flange on the inner end of said housing, said riser extending through said housing, an abutment ring on the inner end of said riser for engaging said flange and transmitting the decelerating load of said parachute to the aircraft and a winding drum mounted in the aircraft and connected to the inner end of said control line, whereby upon operation of said winding drum said control line will pull said reefing lines to reduce the diameter of said canopy and collapse the same, said stop moving into engagement with said abutment, and upon further operation of said winding drum said riser will move inwardly with said control lines and be wound on said drum to retract said parachute within said housing.

2. A retractable parachute system for aircraft, said system including a parachute canopy, a plurality of disks secured to the edge of said canopy at spaced points, each disk having an aperture therein for facilitating attachment to said canopy, a second aperture in each disk for facilitating attachment to the outer end of a shroud line thereto, an elongated tubular riser, the inner ends of the shroud lines being connected to the outer end of said tubular riser, a third aperture in each disk, reefing lines threaded through said third apertures and extending radially inwardly of said canopy with the inner ends of said reefing lines secured at a common point centrally of said canopy, the opposite ends of said reefing lines being brought together and connected to the outer end of a control line, said control line extending through said riser, an abutment on the outer end of said riser, a stop on said control line outwardly of said abutment, a parachute receiving tubular housing fixed in the aircraft, said housing having a flared outer end, a flange on the inner end of said housing, said riser extending through said housing, an abutment ring on the inner end of said riser for engaging said flange and transmitting the decelerating load of said parachute to the aircraft and a winding drum mounted in the aircraft and connected to the inner end of said control line, whereby upon operation of said winding drum said control line will pull said reefing lines to reduce the diameter of said canopy and collapse the same, said top moving into engagement with said abutment, and upon further operation of said winding drum said riser will move inwardly with said control line and be wound on said drum to retract said parachute within said housing.

3. A retractable parachute system for aircraft, said system including a parachute canopy, shroud lines secured to the edge of said canopy at spaced points, an elongated tubular riser, the inner ends of the shroud lines being connected to the outer end of said tubular riser, a plurality of rings secured to the edge of said canopy at spaced points, reefing lines threaded through said rings and extending radially inwardly of said canopy with the inner ends of said reefing lines secured together at a common point centrally of said canopy, the opposite ends of said reefing lines being brought together and connected to the outer end of a control line, said control line extending through said riser, an abutment on the outer end of said riser, a stop on said control line outwardly of said abutment, a parachute receiving tubular housing fixed in the aircraft, said housing having a flared outer end, a flange on the inner end of said housing, said riser extending through said housing, an abutment ring on the inner end of said riser for engaging said flange and transmitting the decelerating load of said parachute to the aircraft and a winding drum mounted in the aircraft and connected to the inner end of said control line, whereby upon operation of said winding drum said control line will pull said reefing lines to reduce the diameter of said canopy and collapse the same, said top moving into engagement with said abutment, and upon further operation of said winding drum said riser will move inwardly with said control line and be wound on said drum to retract said parachute within said housing.

4. A retractable parachute system for aircraft, said system including a parachute canopy, shroud lines secured to the edge of said canopy at spaced points, an elongated tubular riser, the inner ends of the shroud lines being connected to the outer end of said tubular riser, a plurality of rings secured to the edge of said canopy at spaced points, reefing lines threaded through said rings and extending radially inwardly of said canopy with the inner ends of said reefing lines secured together at a common point centrally of said canopy, the opposite ends of said reefing lines being brought together and connected to the outer end of a control line, said control line extending through said riser, an abutment on the outer end of said riser, a stop on said control line outwardly of said abutment, a parachute receiving tubular housing fixed in the aircraft, a flange on the inner end of said housing, said riser extending through said housing, an abutment ring on the inner end of said riser for engaging said flange and transmitting the decelerating load of said parachute to the aircraft and a winding drum mounted in the aircraft and connected to the inner end of said control line, whereby upon operation of said winding drum said control line will pull said reefing lines to reduce the diameter of said canopy and collapse the same, said stop moving into engagement with said abutment, and upon further operation of said winding drum said riser will move inwardly with said control line and be wound on said drum to retract said parachute within said housing.

5. A retractable parachute system for aircraft, said system including a parachute canopy, shroud lines secured to the edge of said canopy at spaced points, an elongated tubular riser, the inner ends of the shroud lines being connected to the outer end of said tubular riser, a plurality of rings secured to the edge of said canopy at spaced points, reefing lines threaded through said rings and extending inwardly of said canopy with the inner ends of said reefing lines secured together at a common point centrally of said canopy, the opposite ends of said reefing lines being brought together and connected at the outer end of a control line, said control line extending through said riser, a parachute receiving tubular housing fixed in the aircraft, a flange on the inner end of said housing, said riser extending through said housing, an abutment ring on the inner end of said riser for engaging said flange and transmitting the decelerating load of said parachute to the aircraft and a winding drum mounted in the aircraft and connected to the inner end of said control line, whereby upon operation of said winding drum said control line will pull said reefing lines to reduce the diameter of said canopy and collapse the same, and upon further operation of said winding drum said riser will move inwardly with said control line and be wound on said drum to retract said parachute within said housing.

6. A retractable parachute system for aircraft, said system including a parachute canopy, shroud lines secured to the edge of said canopy at spaced points, an elongated tubular riser, the inner ends of the shroud lines being connected to the outer end of said tubular riser, a plurality of rings secured to the edge of said canopy at spaced points, reefing lines threaded through said rings and extending radially inwardly of said canopy with the inner ends of said reefing lines secured toegther at a common point centrally of said canopy, the opposite ends of said reefing lines being brought together and connected to the outer end of a control line, said control line extending through said riser, a parachute receiving tubular housing fixed in the aircraft, said riser extending through said housing, abutment means on said riser for engaging a part of the aircraft and transmitting the decelerating load of said parachute to the aircraft and a winding drum mounted in the aircraft and connected to the inner end of said control line, whereby upon operation of said winding drum said control line will pull said reefing line to reduce the diameter of said canopy and collapse the same, and upon further operation of said winding drum said riser will move inwardly with said control line and be wound on said drum to retract said parachute within said housing.

7. A retractable parachute system for aircraft, said system including a parachute canopy, shroud lines secured to the edge of said canopy at spaced points, an elongated tubular riser, the inner ends of the shroud lines being connected to the outer end of said tubular riser, a plurality of rings secured to the edge of said canopy at spaced points, reefing lines threaded through said rings and extending radially inwardly of said canopy with the inner ends of said reefing lines secured together at a common point centrally of said canopy, the opposite ends of said reefing lines being brought together and connected to the outer end of a control line, said control line extending through said riser, a parachute receiving tubular housing fixed in the aircraft, said riser extending through said housing, means on said riser for engaging a part of the aircraft and transmitting the decelerating load of said parachute to the aircraft and a winding drum mounted in the aircraft and connected to the inner end of said control line, whereby upon operation of said winding drum said control line will pull said reefing lines to reduce the diameter of said canopy and collapse the same, and upon further operation of said winding drum said riser will move inwardly with said control line and be wound on said drum to retract said parachute within said housing.

References Cited in the file of this patent

UNITED STATES PATENTS

| | | |
|---|---|---|
| 1,758,170 | Parker | May 13, 1930 |
| 1,770,954 | Stone | July 22, 1930 |
| 2,363,732 | Jenkins | Nov. 28, 1944 |
| 2,384,127 | Nailor | Sept. 4, 1945 |
| 2,709,054 | Roth | May 24, 1955 |
| 2,729,408 | Quilter | Jan. 3, 1956 |
| 2,761,636 | Finlay | Sept. 4, 1956 |